United States Patent [19]

Minamidate

[11] 4,282,938
[45] Aug. 11, 1981

[54] VIBRATION INSULATION DEVICE FOR HANDLE OF VIBRATORY MACHINE
[75] Inventor: Makoto Minamidate, Miura, Japan
[73] Assignee: Yokosuka Boat Kabushiki Kaisha, Yokosuka, Japan
[21] Appl. No.: 968,980
[22] Filed: Dec. 13, 1978
[30] Foreign Application Priority Data
Mar. 25, 1978 [JP] Japan .................. 53/34393
[51] Int. Cl.³ ............................ E21B 3/00
[52] U.S. Cl. ............................ 173/162 H
[58] Field of Search ........... 173/162 H, 139; 175/56; 16/110 R; 248/559, 206 A

[56] References Cited
U.S. PATENT DOCUMENTS
3,845,827  11/1974  Schulin .................. 173/162 H
3,945,119  3/1976  Nagashima et al. .......... 173/162 H Primary Examiner—Ronald Feldbaum

[57] ABSTRACT

A vibration insulation device for a handle of vibratory machine, which is characterized by comprising: a spring K adapted to be displaced in the direction of unidirectional vibration transmitted to the handle, and a dynamic vibration absorber consisting of a cantilevered spring Kd, a magnetic damper cd and a conductive weight plate md provided in the section m to be insulated.

In case the vibration is directional, i.e. when the vibration is caused in X and Y directions, the above described unit consisting of the spring K and the dynamic vibration absorber is disposed for respective directions of vibration.

10 Claims, 17 Drawing Figures

FIG. 10    FIG. 11
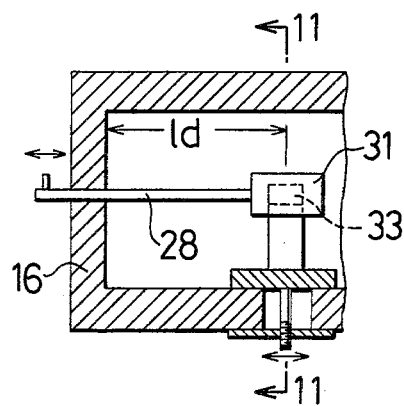
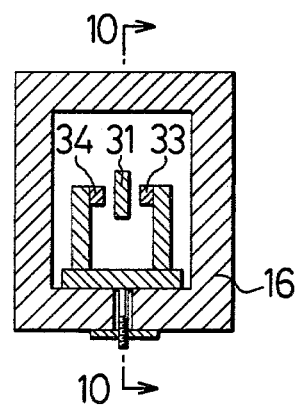
FIG. 12
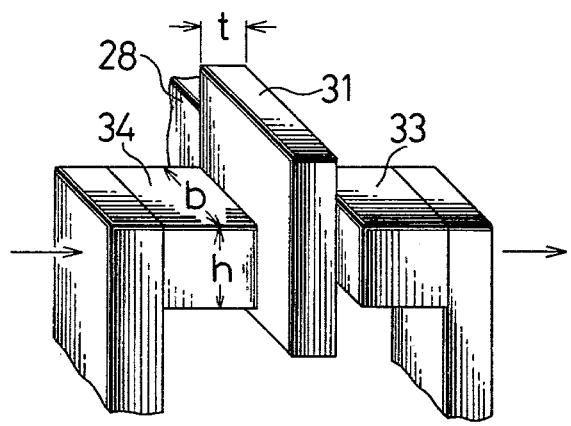
FIG. 13
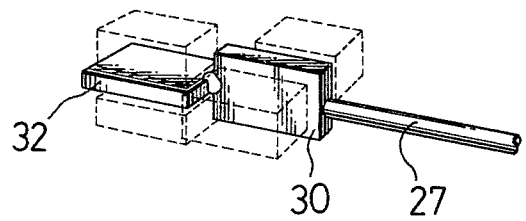

FIG. 14
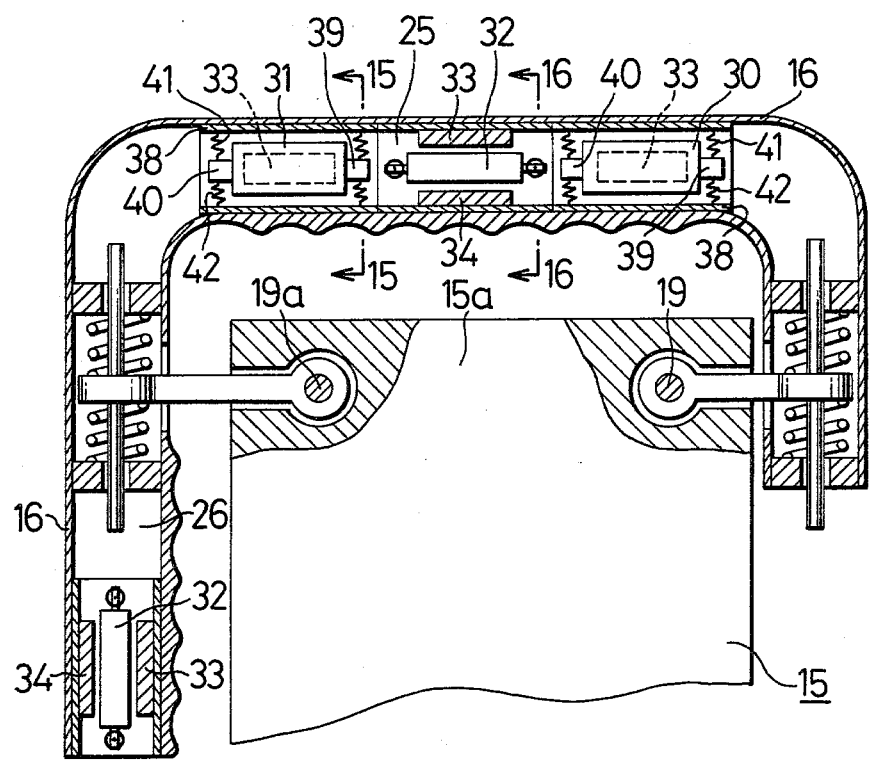
FIG. 15 FIG. 16 FIG. 17
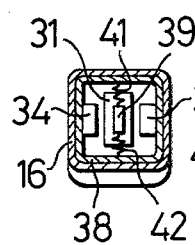 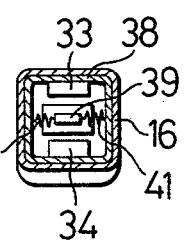 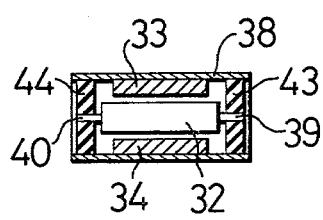

VIBRATION INSULATION DEVICE FOR HANDLE OF VIBRATORY MACHINE

BACKGROUND OF THE INVENTION

The present invention relates to a device for insulating handles from vibration which would, otherwise be transmitted to the handle, in such machines and cause a vibration during the operation, e.g. chain saw, hand breaker for soil engineering or the like.

In these machines which cause or produces vibration, such as chain saws, a vibration acceleration as large as 3 to 40 G is inconveniently transmitted to the handle, so that the workers who handle the machine often suffer from Raynaud's disease. For this reason, an adequate counter-measure for isolating the vibration has been longed for, as is well known.

Conventionally, various countermeasures have been taken, among which the most popular one is to connect the handle to the vibration source, such as engine and chain drive, through a medium of a number of cushioning rubbers. However, this counter measure still falls short of overcoming the above stated problem completely, mainly for the following reasons. Namely, the damping component of the rubber cannot insulate the handle from the vibration especially when the frequency of the vibration is high, as in the chain saw. In addition, the freeness of design is inconveniently restricted due to the nature inherent in the rubber. At the same time, the vibration-isolation characteristic is soon changed due to aging, so that the vibration-isolation performance is deteriorated shortly. Further, the support of the saw is made unstable because of the presence of a number of cushion rubbers, and the power transmission from the handle to the saw is made uncertain, so as to deteriorate the cutting performance of the saw. Furthermore, the cushioning rubber, which is inherently not so strong, is likely to be broken during operation, to incur an unexpected accident.

It is therefore a principal object of the invention to overcome above stated problems or drawbacks of the prior art by providing an improved device for isolating or insulating the handle from vibration in vibration making machines which has a substantial freedom of design to facilitate the optimum design, is less likely to suffer from aging, has a good directionability of the saw and a safe transmission of human force through the handle when the saw is stopped or operated at a low frequency of vibration, is capable of performing a thorough vibration isolation for vibrations at a high frequency range, and small-sized and light-weight with a simple and compact construction.

A reference shall be made here to another type of conventional vibration insulating machine. More specifically, in the so-called a type vibration absorbing device having a spring K interposed between a vibration source 15 and an insulated section m as shown in FIG. 2a, the amplitude ratio at the section m with respect to the vibration source 15 is as small as zero, as will be seen from the characteristic curve a, when the frequency of the vibration is sufficiently high. This feature is quite advantageous in the vibration isolation. However, unfortunately, there is a peak of the resonance point $\sqrt{k/m}$ in the region of low frequency of vibration. Thus, in the course of acceleration after starting, there is a point at which the amplitude of the vibration from the source 15 is inconveniently amplified and transmitted to the section m. This often places the machine dangerously out of order.

There has also been proposed a b type vibration absorbing system in which a damper c is interposed between the vibration source 15 and the insulated section m, in parallel with the spring K. This arrangement allows the peak of amplitude ratio to be limited to 1:1. However, at the high frequency range, the vibration is inconveniently transmitted to the section m through the damper c. Further, since the damper relies upon oil, the kinematic coefficient of viscosity is changed by two times by a change of temperature by 10° from the normal ambient temperature, so as to cause a fluctuation in the damping coefficient. In addition, it is necessary to take a specific measure to prevent the oil from leaking out of the damper. However, this measure is usually incompatible with the elimination of mechanical frictional contact, so that the design of the device has been rendered highly difficult.

It is therefore a second object of the invention to overcome above stated problems. To this end, a low-pass characteristic is preferred in which, as shown in FIG. 1, the peak around the resonance point in the low frequency range is suppressed so as to make the amplitude ratio 1:1, thereby to realize the so-called stiff condition of the machine, i.e. the state in which the vibration source 15 and the section m are connected to each other rigidly, whereas the vibration is isolated thoroughly in the high frequency range. Further, the damping coefficient of the damper is made adjustable to afford an outstanding damping effect. In addition, the device should be free from frictional mechanical contact of its parts, easy to handle and attractive in price.

SUMMARY OF THE INVENTION

Briefly, the invention aims at providing an improved vibration absorbing devide of c type, in which the remarkable vibration isolation effect at the high frequency range performed by the b type device is effectively combined with the 1:1 amplitude ratio presented by the b type device at the low frequency range, as shown in FIG. 2C.

More specifically, the characteristic feature of the invention resides in a compound provision of a spring k adapted to be displaced in the direction of unidirectional vibration transmitted to the handle, and a dynamic vibration absorber consisting of a cantilevered spring kd, magnetic damper cd and a conductive weight plate md provided in the section m to be insulated. In case the vibration is directional, i.e. when the vibration is caused in x and y directions, the unit consisting of the spring k and the dynamic vibration absorber is disposed for respective directions of vibration.

BRIEF DESCRIPTION OF THE DRAWINGS

FIG. 10 is a vertical sectional view taken along the line 10—10 of FIG. 11, showing means for finely adjusting a dynamic vibration absorber incorporated in the device of the invention.

FIG. 11 is a sectional view taken along the line 11—11 of FIG. 10,

FIG. 12 is an enlarged perspective view of an essential part of the fine adjusting means, FIG. 13 is a perspective illustration of an essential part of an example of the dynamic vibration absorber arranged to prepare for vibration components of two directions.

FIG. 14 is an enlarged longitudinal sectional view showing another embodiment of an essential part, same as that shwon in FIG. 6, FIG. 15 is a vertical sectional view taken along the line 15—15 of FIG. 14, FIG. 16 is a vertical sectional view taken along the line 16—16 of FIG. 14, and FIG. 17 is a sectional view showing the third embodiment of the dynamic vibration absorber.

DESCRIPTION OF THE PREFERRED EMBODIMENT

Figure 3:
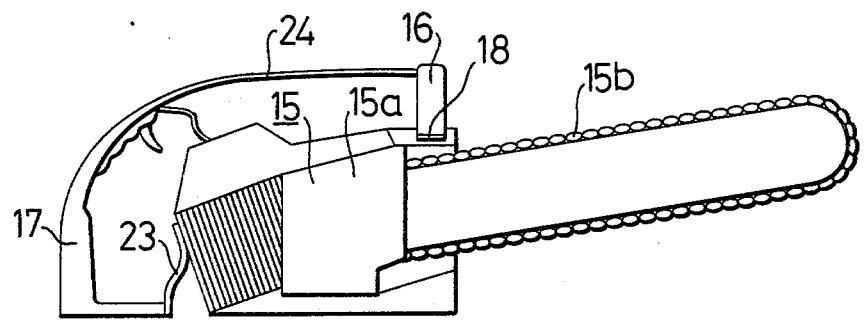
FIG. 3 is a left-hand side elevational view of a practical embodiment of the invention incorporated in a chain saw.
Figure 4:
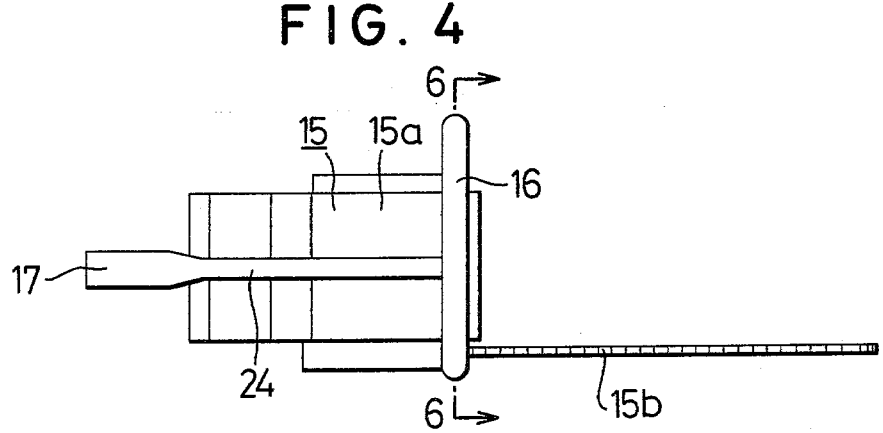
FIG. 4 is a plan view of the embodiment as shown in FIG. 3.
Figure 5:
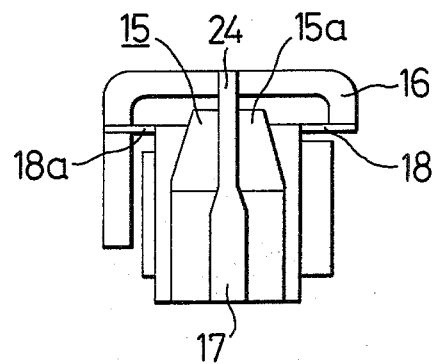
FIG. 5 is a back side elevational view of the embodiment.

Hereinafter, the construction and the operation of the device in accordance with the invention will be described, by way of example, with reference to FIGS. 3 and following Figures showing a chain saw incorporating the device of the invention.

The vibration caused in a chain saw can be divided into three components: a back-and forth component, up-and-down component (component in which the saw is fed) and right-and-left component. Among these components, the right-and-left component has proved to be extremely small due to the restriction by the movement of the piston of the engine, inertia of rotation of the saw blade and the cutting, so that this component can be neglected in considering the vibration isolation. Thus, in this embodiment of the invention, the fore handle 16 is prepared for isolation of vibration components in back-and-forth and up-and-down (direction of feed of saw blade) directions, while the rear handle 17 is prepared for the isolation of the back-and-forth component of the vibration.

The vibration source 15 includes an engine 15a and a chain-like saw blade 15b. Corresponding to this vibration source, a corridor-shaped fore handle 16 is provided to have a horizontal section extending in right-and-left direction laid over the vibration source 15 and two vertical sections located at both sides of the latter. The vibration source 15 is suspended from the fore handle 16 at two lateral points near the top ends of the engine 15a.

Figure 6:
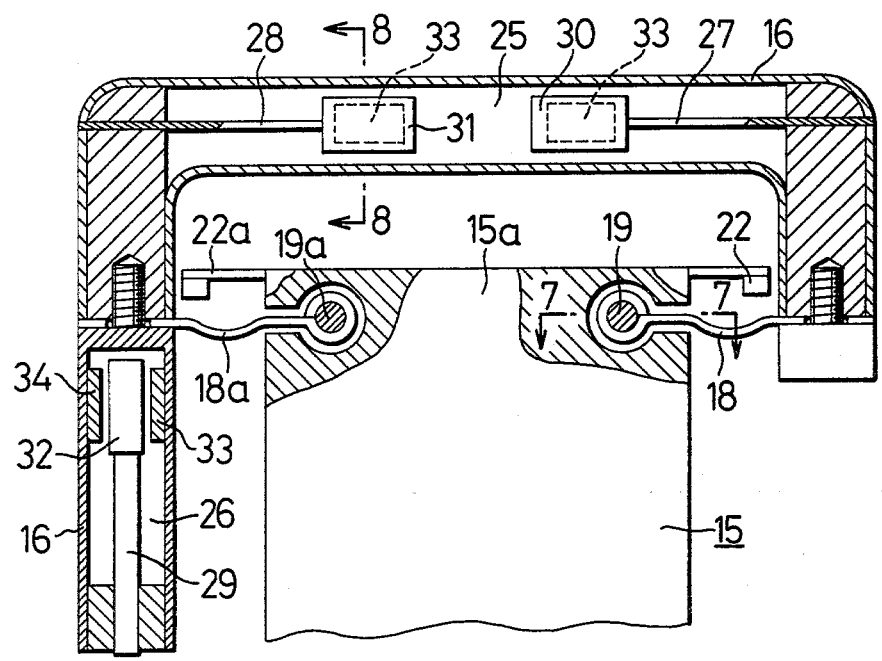
FIG. 6 is an enlarged longitudinal sectional view of an essential part taken along the line 6—6 of FIG. 4.
Figure 7:
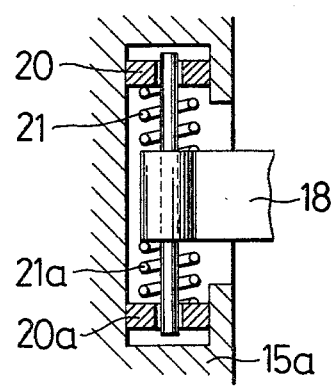
FIG. 7 is a sectional view taken along the line 7—7 of FIG. 4.
Figure 8:
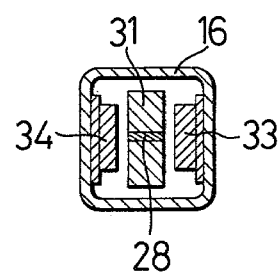
FIG. 8 is a sectional view taken along the line 8—8 of FIG. 4.
Figure 9:
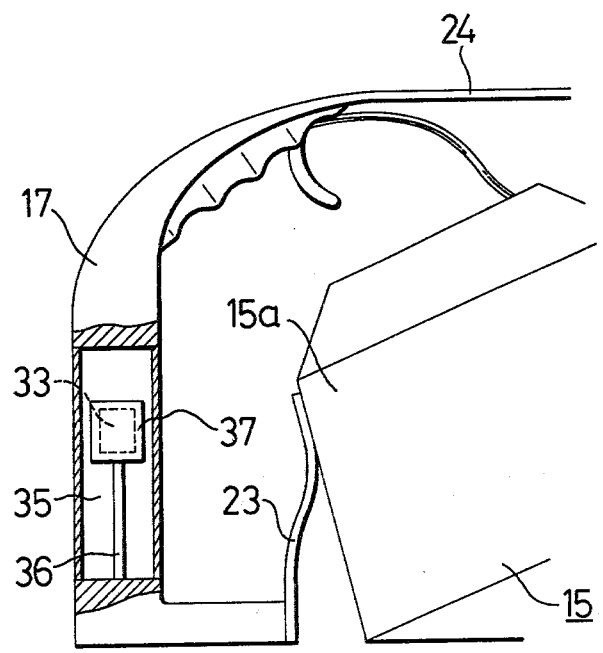
FIG. 9 is a partially cut-away side elevational view showing the left-hand side end of the embodiment as shown in FIG. 3.

The connection between the fore handle 16 and the vibration source 15 is made as follows. Referring to FIGS. 6 and 7, a pair of leaf springs 18, 18a are disposed for displacement in the direction of the up-and-down vibration component. At the same time, thrust shafts 19, 19a extending in the direction of the back-and-forth vibration component are connected at their intermediate portions to the base portions of respective leaf springs. As will be seen from FIG. 7, the thrust shafts 19, 19a are born at both their front and rear ends by respective thrust bearings 20, 20a fixed to the engine casing. Between each thrust bearing and the corresponding base portion of the leaf spring, a pair of coiled springs 21, 21a are interposed, having the same spring constant, so that these springs may act to expand and shrink in response to the back-and-forth component of the vibration.

Referring now to FIG. 6, reference numerals 22 and 22a denote stoppers for preventing the leaf springs from being deformed by excessive strokes or amplitudes.

The connection of a rear handle 17 is made through a leaf spring 23 interposed between the handle 17 and the rear face of the engine 15a and adapted to be displaced in the back-and-forth direction. At the same time, the rear handle 17 is connected to the fore handle 16 through a T-shaped connecting member 24.

As shown in FIG. 6, cavities 25, 26 are formed in the horizontal and vertical sections of the fore handle 16. Cantilevered springs 27, 28 are disposed along the length of these cavities. Each of the cantilevered springs is fixed at its one end to the inside of the handle 16, while the other end, i.e. the free end thereof carries conductive weight plates 30, 31 and 32. The plates are so arranged as to lie in parallel with either one of directions of up-and-down and back-and-forth. More specifically, in the illustrated embodiment, the plates 30, 31 are arranged for the up-and-down direction component of the vibration, whereas the plate 32 is positioned for the back-and-forth component of the vibration, respectively.

It is possible to mount the conductive weight plate 30 preparing for the up-and-down component of the vibration and the conductive weight plate 32 stationed for the back-and-forth component of the vibration simultaneously on the free end of the cantilevered spring 27, unitarily with each other. In this case, needless to say, the latermentioned magnetic field has to be formed in accordance with this arrangement of the conductive weight plate.

Small-sized and high-performance permanent magnets such as samarium-cobalt magnets 33, 34 of 12,000 gauss are disposed in the cavities of the handle, so that the conductive weight plates 30, 31 and 32 may be positioned in strong magnetic fields acting across these plates. Thus, the conductive weight plates 30, 31 and 32 are made to move across the corresponding magnetic fields at a right angle to the latter, as the vibration takes place. Consequently, eddy currents are generated in the plates in accordance with the Fleming's rule, acting against the vibration force to suppress the latter, thereby to insulate the handle from the vibration. The invention aims at keeping the amplitude ratio as small as about 1:1, by making the the positive use of this limited low-pass characteristic of the dynamic vibration absorber having a magnetic damper of the kind described.

Turning now to the rear handle 17, as will be seen from FIG. 17, the same dynamic absorber as that of the fore handle is incorporated also in this rear handle 17 which is connected to the back side of the engine 15a through the aforementioned leaf spring 23 which is displaceable in the back-and-forth direction.

Figure 1:
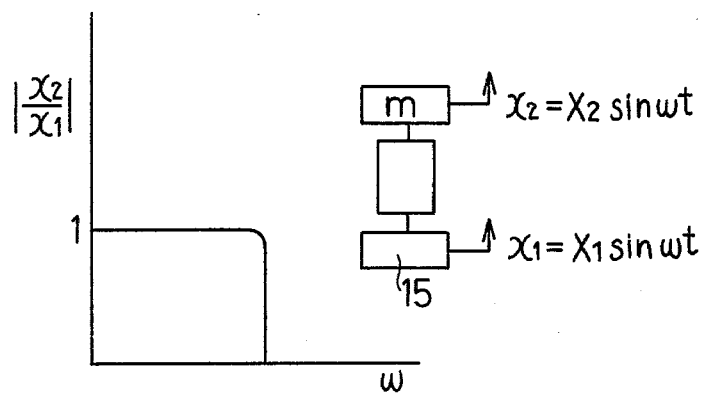
FIG. 1 shows a characteristic curve representing an ideal or ultimate relationship between the frequency and amplitude of vibration, aimed at by the present invention.
Figure 2:
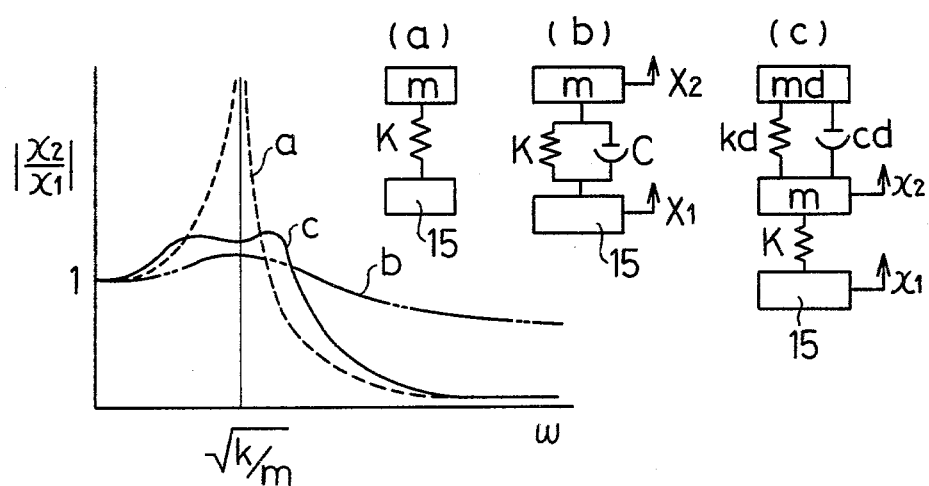
FIG. 2 shows a characteristic curve of the relationship between the frequency and amplitude exhibited by the device of the invention, along with that shown by conventional devices.

More specifically, a cavity 35 is formed in the rear handle 17. A cantilevered spring 36 accommodated in the cavity and extending along the length of the same is connected at its one end to the rear handle 17. The free end of the spring 36 carries a conductive weight plate 37 disposed in parallel with the direction of the back-and-forth component of the vibration. A pair of permanent magnets 33 and 34 are disposed such that the resulting magnetic field acts across the conductive weight plate 37 at a right angle to the latter. This arrangement affords a controlled low-pass characteristic as obtained in the fore handle, in combination with the remarkable vibration-insulating characteristic of the leaf spring 23, the characteristic as shown by the full line curve in FIG. 2, i.e. the c type characteristic also for the rear handle 17.

Referring to FIG. 2C, the low-pass characteristic is determined by the resonance frequency $\sqrt{k/m}$ given by the mass m of the handle and the spring constant k. Thus, when a vibration of a frequency which is 10 times as large as the resonance frequency $\sqrt{k/m}$ is applied, the vibration amplitude transmitted to the handle is conveniently reduced to 1/10. Similarly, for the frequency 100 times as large as the resonance frequency, the vibration amplitude is reduced to 1/100.

However, the construction consisting solely of the spring constant k and the mass m exhibits the characteristic curve (broken line in FIG. 2) of the a-type vibration absorber. This causes a dangerously large amplitude of vibration transmitted to the handle, when a vibration is caused at a low frequency coinciding with the resonance frequency. To avoid this, the dynamic vibration absorber as stated before is connected in series to the system consisting of k and m, for maintaining the amplitude ratio at 1:1 or so when the vibration frequency is around the resonance frequency $\sqrt{k/m}$. Consequently, the characteristic of c type, in which the b-type characteristic is available at the low frequency range and the a type characteristic at the high frequency range are made compatible.

The optimum adjustment of the dynamic vibration absorber for presenting the characteristic curve as shown in FIG. 2C should satisfy the following equations:

$$kd/k = \mu \left( \frac{1}{1 + \mu} \right)^2 \quad (1)$$

$$cd = 2\sqrt{md\ k} \cdot \sqrt{\frac{3\mu^2}{8(1 + \mu)^3}} \quad (2)$$

where,
k: spring constant of a spring interposed between the vibration source 15 and the handle m
m: mass of the handle
kd: spring constant of cantilevered spring incorporated in the dynamic vibration absorber
md: mass of conductive weight plate incorporated in the dynamic vibration absorber
cd: damping coefficient of the dynamic vibration absorber
μ: ratio of mass md/m FIG. 10 to FIG. 12 inclusive show an example of means for effecting fine adjustment of the dynamic vibration absorber wherein:
ld: projection length of cantilevered spring 28
Ed: Young's modulus of the spring 28
Id: moment of inertia of area of the spring 28

The spring constant Kd of the spring 28 is given by the following equation (3).

$$Kd = \frac{3Ed\ Id}{l\ d^3} \quad (3)$$

It will be seen that the spring constant is adjustable from the outside by changing the projection length of the cantilevered spring 28.

Concerning the damping coefficient Cd, it is given by the following equation (4).

$$Cd = K_1 \frac{VB^2}{\rho} \text{ (dyne. sec/cm)} \quad (4)$$

where,
V = h b t (mm³)
$K_1 = 0.5$ to $0.2 \times 10^{-14}$ and
V: Volume of the conductive weight plate 31 in the magnetic field
B: magnetic density of the magnetic field (gauss)
ρ: specific resistance of the conductive weight plate 31
$K_1$: constant given in accordance with the shape of the magnetic damper As will be seen from the equation (4) above, the damping coefficient Cd can be optionally changed by changing anyone of the ρ, B and V.

FIGS. 14 to 17 show another embodiment of the present invention being applied for a handle in a chain saw. A merit of this embodiment is that it can make the dynamic vibration absorber small and compact, in particular, to reduce the length of the longitudinal direction thereof, as described below.

The conductive weight plate 30, 31 and 32 of the dynamic vibration absorber as shown in FIGS. 6 to 13 are fixed at the free end portion of the cantilevered springs 27, 28 and 29 which are long as a fishing rod, so that it will be difficult to juxtapose them as a result of long space in longitudinal direction in the handle 16.

The dynamic vibration absorber in FIG. 14 improves upon the above demerit, and not only reduces the length thereof, but also can more easily change a unit of the dynamic vibration absorber so that it can be compactly built in the cylindrical casing 38.

In FIG. 14, the embodiment is the same as that shown in FIG. 6 to provide cavities 25 and 26 at the vertical and horizontal sections in the fore handle 16, however, it is unique that a complete unit of the dynamic vibration absorber is built in the cylindrical casing 38 to be inserted in the cavity. Vibration insulation effect is even more improved as a result because it permits to insert in the cavities 25 and 26 of the dynamic vibration absorbers as many as possible.

Constructions to be capable of the above effect are noted below. As a means for suspending so as to be floating, the conductive vibration absorber 30, 31 and 32 at the center of the cylindrical casing 38, a pair of coil springs 41 and 42 having the same spring constant are oppositely suspended between the cylindrical casing 38 and shafts 39, 40 projecting from the centers of each end of the conductive weight plate.

In an embodiment as shown in FIG. 17, elongation members 43 and 44 made from a sponge rubber or the like are inserted between the cylindrical casing 38 and the shafts 39, 40 projecting from the center of each end of the conductive weight plate 32. Thus, the plate 32 is supported by the elongation members.

Thanks to the above described construction, the device of the invention has a larger degree of freedom in design, as compared with conventional devices consisting of cushioning rubber, so that the optimum adjustment and design can be obtained to cope with the requirements, and, at the same time, entirely free from aging.

Further, the low-pass characteristic which makes the amplitude ratio, i.e. the ratio of vibrations of the handles 16, 17 to that of the vibration source 15, nearly 1:1 to afford the so-called stiff construction, which in turn allows a safe and sure transmission of human handling power from the handle to the saw to define the direction of the latter, and to improve the cutting efficiency. At the same time, the vibration of high frequency, which has caused the Raynaud's disease is checked and interrupted by the springs 18, 18a and 19, 19a which are disposed in series to the dynamic vibration absorber. Thus, the working efficiency is remarkably improved over the whole frequency range of the vibration. In addition, the magnetic damper relying upon the permanent magnet is entirely free from the mechanical frictional contact of parts, and can exhibit a stabler damping characteristic over the conventional damper relying upon oil, against the change of the ambient temperature.

It will be seen from the foregoing embodiment that the invention provides a small-sized, simple, compact, easy to handle and costless vibration-insulation device which can well fulfill the objects of the invention.

What is claimed is:

1. In a vibratory machine in which a unidirectional vibration is caused by a vibration source in a direction perpendicular to the longitudinal direction of a handle of said machine, said handle having a grip, a device for insulating said handle from said vibration comprising:
   a spring interposed between the vibration source and said handle, for free displacement in the direction of said vibration;
   a dynamic vibration absorber including a conductive weight plate suspended in a cavity formed in the grip of said handle so as to be adapted to float along the direction of said vibration and extending in the same direction as said vibration, and a pair of permanent magnets disposed in said cavity and adapted to produce a magnetic field acting at a right angle to said plate.

2. In a vibratory machine in which a vibration is caused by a vibration source in x and y directions which are normal to the longitudinal direction of a grip of a handle of said machine, a device for insulating said handle from said vibration comprising:
   a spring interposed between said handle and the vibration source for free displacement in the x direction;
   a dynamic vibration absorber including a conductive weight plate suspended in a cavity formed in said grip so as to be adapted to float along the x direction of said vibration and extending in parallel with the x direction, and a pair of permanent magnets disposed in said plate at a right angle thereto;
   another spring interposed between said handle and the vibration source for free displacement in the y direction;
   another dynamic vibration absorber including a conductive weight plate suspended in a cavity formed in said grip so as to be adapted to float along the y direction of said vibration and extending in parallel with the y direction, and a pair of permanent magnets disposed in said cavity for producing a magnetic field which acts on said plate at a right angle thereto.

3. In a chain saw having a fore handle with a grip and including a laterally extending horizontal section above a vibration source of said chain saw and two side vertical sections, as well as a rear handle with a grip and having a vertical section connected to the rear portion of said vibration source, said handles being connected to each other through a T-shaped connection member,
   a device for insulating said handles from the vibration caused by said vibration source comprising:
   a spring interposed between said fore handle and said vibration source for free displacement in the direction of an up-and-down component of said vibration;
   a dynamic vibration absorber including a conductive weight plate suspended in a cavity formed in the grip so as to be adapted to float along the up-and-down component of said vibration and extending in the direction parallel with the direction of the up-and-down component of the vibration, and a pair of permanent magnets disposed in said cavity for producing a magnetic field which acts on said plate at a right angle to the plate;
   another spring interposed between said fore handle and said vibration source for free displacement in the direction of the back-and-forth component of said vibration;
   another dynamic vibration absorber including a conductive weight plate suspended in a cavity formed in said grip so as to be adapted to float along the back-and-forth component of the vibration and extending in parallel with said back-and-forth component of vibration, and a pair of permanent magnets disposed in said cavity so as to produce a magnetic field acting on said plate at a right angle thereto;
   a further spring interposed between said rear handle and said vibration source for free displacement in the direction of the back-and-forth component of vibration;
   a further dynamic vibration absorber including a conductive weight plate suspended in a cavity formed in the grip of said rear handle so as to be adpated to float along the back-and-forth component of vibration and extending substantially in parallel with the direction of the back-and-forth component of vibration, and a pair of permanent magnets disposed in said cavity so as to produce a magnetic field acting on said plate at a right angle thereto.

4. A vibration insulation device as claimed in any one of claims 1, 2, or 3 comprising a cantilevered spring, for floating the conductive weight plate, which cantilevered spring extends along the length of said cavity, one end thereof being fixed at said cavity, and said conductive weight plate being fixed at the free end thereof.

5. A vibration insulation device as claimed in any one of claims 1, 2, or 3 wherein both ends of the conductive weight plate are respectively suspended at the center in the cavity by springs.

6. A vibration insulation device as claimed in any one of claims 1, 2, or 3 wherein a plurality of dynamic vibration absorbers are disposed in the same cavity for insulating the handle from a vibration component of the same direction.

7. A vibration insulation device as claimed in any one of claims 1, 2, or 3 wherein a plurality of dynamic vibration absorbers are disposed in the same cavity for insulating said handle from vibration components of different directions.

8. A vibration insulation device as claimed in any one of claims, 1, 2, or 3 wherein a plurality of conductive weight plates are provided on the free end of a common cantilevered spring so as to correspond to the vibration components of different directions, and wherein a number of magnetic fields are formed corresponding to the number of said conductive weight plates to cooperate with said plates.

9. A vibration insulation device as claimed in claim 4 comprising means for adjusting the projection length of the cantilevered spring.

10. A vibration insulation device as claimed in any one of claims 1, 2, or 3, wherein said dynamic vibration absorber includes means for varying the magnetic damping coefficient of said dynamic vibration absorber.

* * * * *